United States Patent
Wrobel et al.

(10) Patent No.: US 10,632,818 B2
(45) Date of Patent: Apr. 28, 2020

(54) MITIGATING ENVIRONMENTAL-CONTROL LOAD FOR A HYBRID VEHICLE

(71) Applicant: Toyota Motor Engineering & Manufacturing North America, Inc., Erlanger, KY (US)

(72) Inventors: Shannon Alicia Wrobel, Ann Arbor, MI (US); Joshua D. Payne, Ann Arbor, MI (US); Heraldo F. Stefanon, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 221 days.

(21) Appl. No.: 15/783,567

(22) Filed: Oct. 13, 2017

(65) Prior Publication Data
US 2019/0111791 A1    Apr. 18, 2019

(51) Int. Cl.
| | |
|---|---|
| *B60H 1/00* | (2006.01) |
| *B60L 1/02* | (2006.01) |
| *B60L 50/62* | (2019.01) |
| *B60L 58/12* | (2019.01) |
| *B60H 1/22* | (2006.01) |
| *G01C 21/34* | (2006.01) |

(52) U.S. Cl.
CPC ......... *B60H 1/00771* (2013.01); *B60H 1/004* (2013.01); *B60L 1/02* (2013.01); *B60H 2001/2262* (2013.01); *B60H 2001/2265* (2013.01); *B60L 50/62* (2019.02); *B60L 58/12* (2019.02); *B60L 2240/34* (2013.01); *B60L 2240/62* (2013.01); *B60W 2510/244* (2013.01); *G01C 21/3469* (2013.01)

(58) Field of Classification Search
CPC ............................ B60H 1/004; B60H 1/00771
See application file for complete search history.

(56) References Cited

U.S. PATENT DOCUMENTS

| | | | |
|---|---|---|---|
| 8,341,971 B2 * | 1/2013 | Oyobe | B60H 1/004 236/1 C |
| 9,008,858 B1 * | 4/2015 | Payne | B60H 1/00771 701/1 |
| 9,067,475 B1 | 6/2015 | Jeong | |
| 9,067,589 B1 | 6/2015 | Zhao et al. | |
| 9,156,330 B2 | 10/2015 | Eisenhour et al. | |
| 9,260,103 B2 | 2/2016 | Porras et al. | |
| 9,385,382 B2 | 7/2016 | Salvador et al. | |
| 2011/0046834 A1 * | 2/2011 | Grider | B60W 10/06 701/22 |
| 2012/0010767 A1 | 1/2012 | Phillips et al. | |
| 2014/0200804 A1 * | 7/2014 | Wippler | G01C 21/3611 701/465 |

(Continued)

*Primary Examiner* — Todd M Melton
(74) *Attorney, Agent, or Firm* — Christopher G. Darrow; Darrow Mustafa PC

(57) ABSTRACT

A method and device for mitigating environmental-control load for a hybrid vehicle are disclosed. In operation, a determination is made as to whether a hybrid vehicle is at a high-power operational mode. When the hybrid vehicle is at a high-power operational mode, a determination of an estimated time-of-travel to a low-power operational mode is made based on vehicle trajectory plan data. Heat-load buffer data is generated based on the estimated time to prolong a passenger comfort setting during the low-power operational mode.

20 Claims, 4 Drawing Sheets

(56) References Cited

U.S. PATENT DOCUMENTS

2016/0061611 A1 3/2016 Meyer et al.
2016/0167642 A1 6/2016 Debert
2018/0201092 A1* 7/2018 Ahuja ................ B60H 1/00771

* cited by examiner

MITIGATING ENVIRONMENTAL-CONTROL LOAD FOR A HYBRID VEHICLE

FIELD

The subject matter described herein relates in general to environmental cabin comfort devices for hybrid vehicles and, more particularly, to the hybrid-vehicle climate control systems to mitigate an electric load of such systems during low-power operational modes.

BACKGROUND

Current vehicles have a constant heat setting selected by the driver. But for hybrid, or electric hybrid, vehicles, a constant heat setting drains and/or diverts stored battery-power that could otherwise be applied to powering the hybrid vehicle power train to extend the vehicle's useful range. A need exists to provide ergonomic comfort to a vehicle user, while also extending the useful travel range of the vehicle.

SUMMARY

A device and method for mitigating an environmental load for a hybrid vehicle are disclosed.

In one implementation, a method in a vehicle control unit for a hybrid vehicle is disclosed. The method includes determining whether the hybrid vehicle is at a high-power operational mode. When the hybrid vehicle is at a high-power operational mode, determining an estimated time-of-travel to a low-power operational mode based on vehicle trajectory plan data. Heat-load buffer data is generated based on the estimated time for prolonging a passenger comfort setting during the low-power operational mode, converting the heat-load buffer data to environmental-control data, and transmitting the environmental-control data for effecting the heat-load buffer data.

In another implementation, a vehicle control unit for a hybrid vehicle is described. The vehicle control unit includes a communication interface, a processor, and a memory. The communication interface is operable to service communication with a network. The processor is communicably coupled to the communication interface, and the memory is coupled to the processor, and stores an environmental transition module including instructions that, when executed by the processor, cause the processor to receive vehicle trajectory plan data having at least a first speed zone and a second speed zone, and to determine whether vehicle sensor data, retrieved via the network, indicates the first speed zone. When the vehicle sensor data indicates the first speed zone, the processor is caused to determine an estimated time to the second speed zone based on the vehicle trajectory plan data. A passenger comfort module including instructions that, when executed by the processor, cause the processor to generate heat-load buffer data for prolonging a passenger comfort setting during the second speed zone based on the estimated time-of-travel to the second speed zone, to convert heat-load buffer data to environmental-control data, and to transmit the environmental-control data for effecting the heat-load buffer data.

BRIEF DESCRIPTION OF THE DRAWINGS

The description makes reference to the accompanying drawings wherein like reference numerals refer to like parts throughout the several views, and wherein.

DETAILED DESCRIPTION

Figure 1:
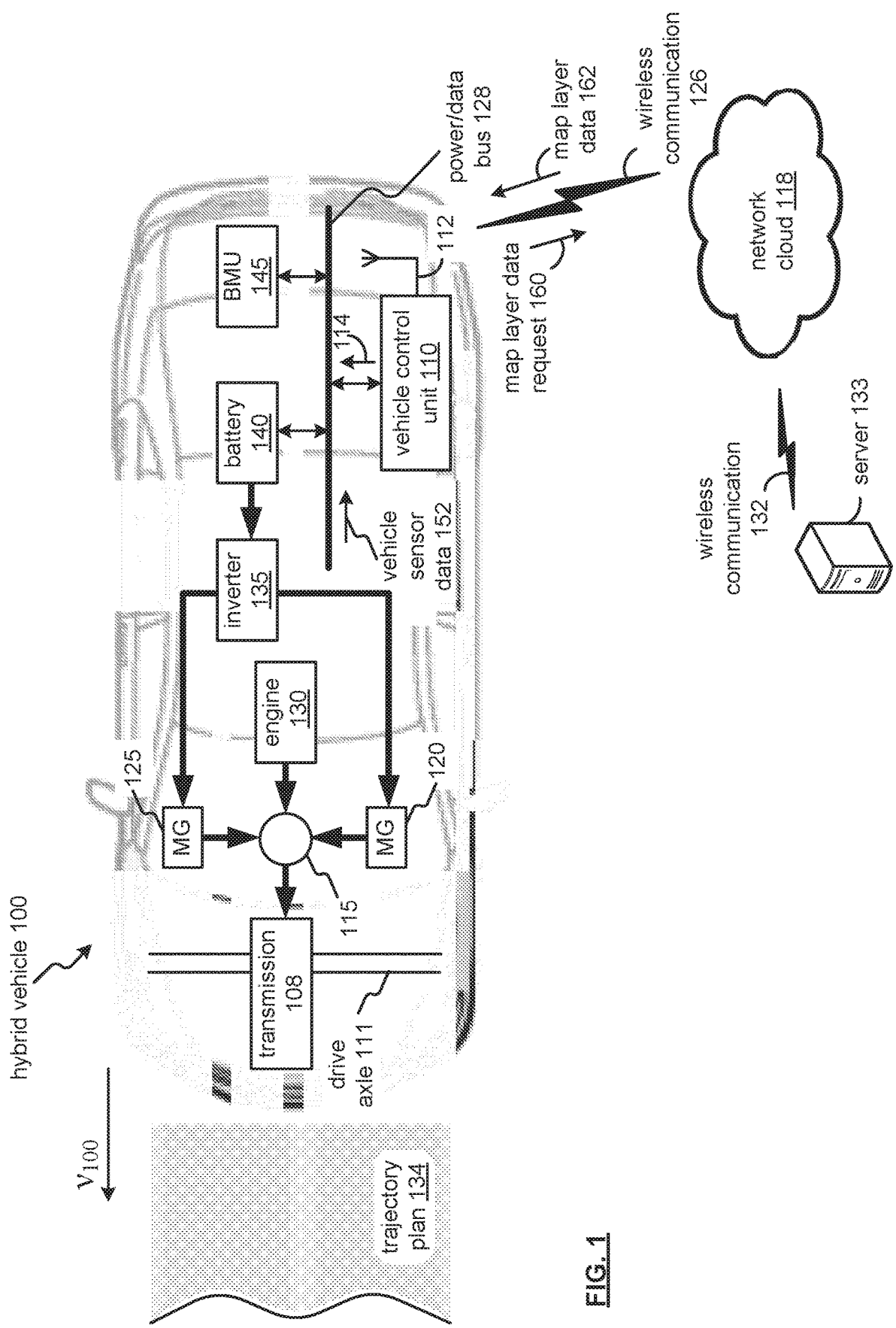
FIG. 1 illustrates a block diagram of a hybrid vehicle with a vehicle control unit.

A device and method for providing ergonomic comfort to a vehicle user, while also extending the useful travel range of the vehicle, are described herein.

Generally, a hybrid vehicle may include an engine portion and an electric motor portion. The engine portion may be powered by combustible fuels, such as diesel, gasoline, bio-diesel, ethanol, liquid propane, etc., as well as fuel combinations thereof.

An example hybrid vehicle may include a 1.8-liter four cylinder gasoline engine, paired with electric motors, or motor generators, that combined may produce at least 121 horsepower. An example hybrid vehicle may also include a continuously variable transmission (CVT), which may function like an automatic transmission.

When passing other vehicles or merging onto a highway at higher speeds, the engine component engages with sufficient power for a high-power operational mode. When the engine component of the hybrid vehicle is in operation, which is typically at faster speeds, heat is generated as a combustion by-product, and accordingly, provides a resource readily available to heat a vehicle cabin according to a passenger comfort setting via the vehicle's environmental controls.

In a low-power operational mode, the electric motors may operate to deliver power when the vehicle's gas pedal is depressed, allowing the vehicle to pull away from a traffic stop briskly to get around traffic in the city. However, for heating while in the low-power operational mode, energy for heating the cabin generally is a function of converting electric (stored) energy from the vehicle battery to heat energy, such as via a resistive heater element.

To prolong the passenger comfort setting while maximizing the stored electric energy of a vehicle battery, the device and method described herein provides a heat-load buffer to utilize the heat by-product and/or power output available from the vehicle engine in view of an estimated time-of-travel to a low-power operational mode, such as navigating city streets, at lower speeds, to the user's destination.

By discharging more heat to the vehicle cabin while on highways or other higher-speed roads to achieve a desired cabin temperature or higher, then when the electric-based component of the hybrid vehicle is operating on lower-speed roadways (such as city streets), the finite battery state-of-charge may be directed to a destination objective, as opposed to directing such energy to heating the vehicle cabin.

Similarly, with respect to cooling the vehicle cabin, a vehicle engine may have sufficient power to drive the cabin cooling system for the vehicle based on a compressor system. With respect to cooling at a low-power operational mode, the hybrid vehicle may include an all-electric air conditioning system similar to household refrigeration units, though at a higher voltage input. In operation, refrigerant may be pumped by the motorized generators through a chiller unit. To further dissipate heat energy from the primary chiller unit, a devoted coolant circuit may circulate an antifreeze mix through a secondary chiller unit to improve efficiency of the primary chiller unit.

Accordingly, the device and method described herein provide hybrid vehicles with a heat-load buffer for a vehicle cabin, which may be based on a passenger comfort setting and ambient temperature of the vehicle environment. The heat-load buffer may take advantage of buffering vehicle cabin environments during a high-power operational mode via a heat by-product of an engine or with cooling by conventional vehicle HVAC systems to minimize the electric load placed on a vehicle battery state-of-charge in a low-power operational mode.

As may be appreciated, a hybrid vehicle may engage a high-power operational mode when greater speed is called on in a first speed zone (such as with higher rates of speed, and greater resulting forces on the vehicle, such as drag, road friction, wind resistance, etc.). On the other hand, a hybrid vehicle may engage a low-power operational mode when lesser speed is called on (such as with lower rates of speed, and lesser resulting forces on the vehicle).

The device and methods described herein may improve passenger comfort by taking advantage of the greater power output of an engine in a high-power operational mode, providing a heat-load buffer during transition to a low-power operational mode, where the heat-load buffer may operate to prolong a passenger comfort setting, including heat and/or cooling, when in a less powerful low-power operational mode supplied by the vehicle battery.

FIG. 1 illustrates a block diagram of a hybrid vehicle 100 with a vehicle control unit 110. The hybrid vehicle 100 may be a hybrid vehicle, a petroleum-hybrid vehicle, a fuel cell vehicle, a fuel-converter electric vehicle, or other similar vehicles.

The vehicle 100 may include a transmission 108 (such as a continuously variable transmission), a drive axle 111, a power splitting device 115, motor generators (MG) 120 and 125, an engine 130, an inverter 135 and a battery 140 (or batteries). The engine 130 and the motor-generators 120 and 125 are mechanically connected to the drive axle 111 via the transmission 108. The vehicle control unit 110 may be communicably coupled via a power/data bus 128 with other control units of the vehicle 100, such as battery management unit (BMU) 145, which may operate to manage the charging of the battery 140, such as during a high-power operational mode, and for discharging of the battery 140, such as during a low-power operational mode to impart rotational force to the drive axle 111 via the transmission 108.

In one example, motor generator 120 may operate to recharge the battery 140 and supply electric power to drive motor generator 125 based on respective operational modes of the hybrid vehicle 100. As may be appreciated, a fuel cell can be used to provide engine 130. In addition, the term "fuel converter" in relation to a hybrid vehicle may refer to a device that receives fuel and converts the fuel into energy or power. Examples of a fuel converter may include, but are not limited to, an internal combustion engine and a fuel cell.

By regulating an amount of electric power generated, motor generator 120 may operate to control the transmission 108, and motor generator 125 can be used to drive the axle 111. The motor generators 120 and 125 and the engine 130 can be used individually or simultaneously to drive the axle 111 of the hybrid vehicle 100. The electric motors can also operate to supplement the engine 130 and/or serve as generators to recharge the battery 140 while the hybrid vehicle 100 is in operation.

The power splitting device 115 can be operable to switch operations from the engine 130 (such as in a high-power operational mode) to the motor-generators 120 and/or 125 (such as in a low-power operational mode), and vice versa. The inverter 135 can be used to convert AC and DC current between motor generators 120 and 125 and the battery 140.

The vehicle control unit 110 may operate to provide heat-load buffer data that may be converted to environmental-control data 114 for effecting a heat-load buffer for a vehicle cabin. As may be appreciated, the heat-load buffer data may be based on an estimated time-of-travel from a first speed zone at a high-power operational mode, such as for highway and/or higher speed zone, to a second speed zone, such as for city, urban and/or other lower speed zones in which the hybrid vehicle may transition to a low-power operational mode.

The antenna 112, communicatively coupled with the vehicle control unit 110, may include one or more conductive elements that interact with electromagnetic signals transmitted by global positioning system satellites. The received signals may be transformed into a data signal indicative of the vehicle location (for example, latitude and longitude positions available via GPS systems), and indicative of the positioning of the hybrid vehicle 100.

The antenna 112 may form a wireless communication with a network cloud 118, such as an Internet, local area network and/or a wide area network, etc., for cloud computing or access to third party services. The server 133 may be operable provide third-party services via a wireless communication 132 and the network cloud 118.

In the example of FIG. 1, the vehicle control unit 110 may generate and transmit a map layer data request 160, and receive in response, map layer data 162 via the wireless communication 126 relating to the trajectory plan 134, as is discussed in detail with reference to FIGS. 2-4.

Generally, fixed parameters relating to a passenger comfort within the vehicle cab may include the R-value of the vehicle shell (that is, the insulation effect of the shell with respect to heat transference from the outside-to-the inside, and vice versa), and the effect of thermal films on the vehicle windows to also provide vehicle insulation. Another fixed parameter may be considered the heating and/or cooling power of the hybrid vehicle's HVAC system. Accordingly, a heat-load buffer may be generated based on such fixed parameters, and further with respect to variable parameters such as an estimated time-to-travel to a second speed zone, in which a low-power operational mode will be engaged by the hybrid vehicle, as well as an effect of ambient temperature. As may be appreciated, an effect of ambient temperature may be mitigated by the R-value of the vehicle shell. When the R-value is sufficiently high, an ambient temperature may be considered negligible in determining the heat-load buffer data.

Figure 2:
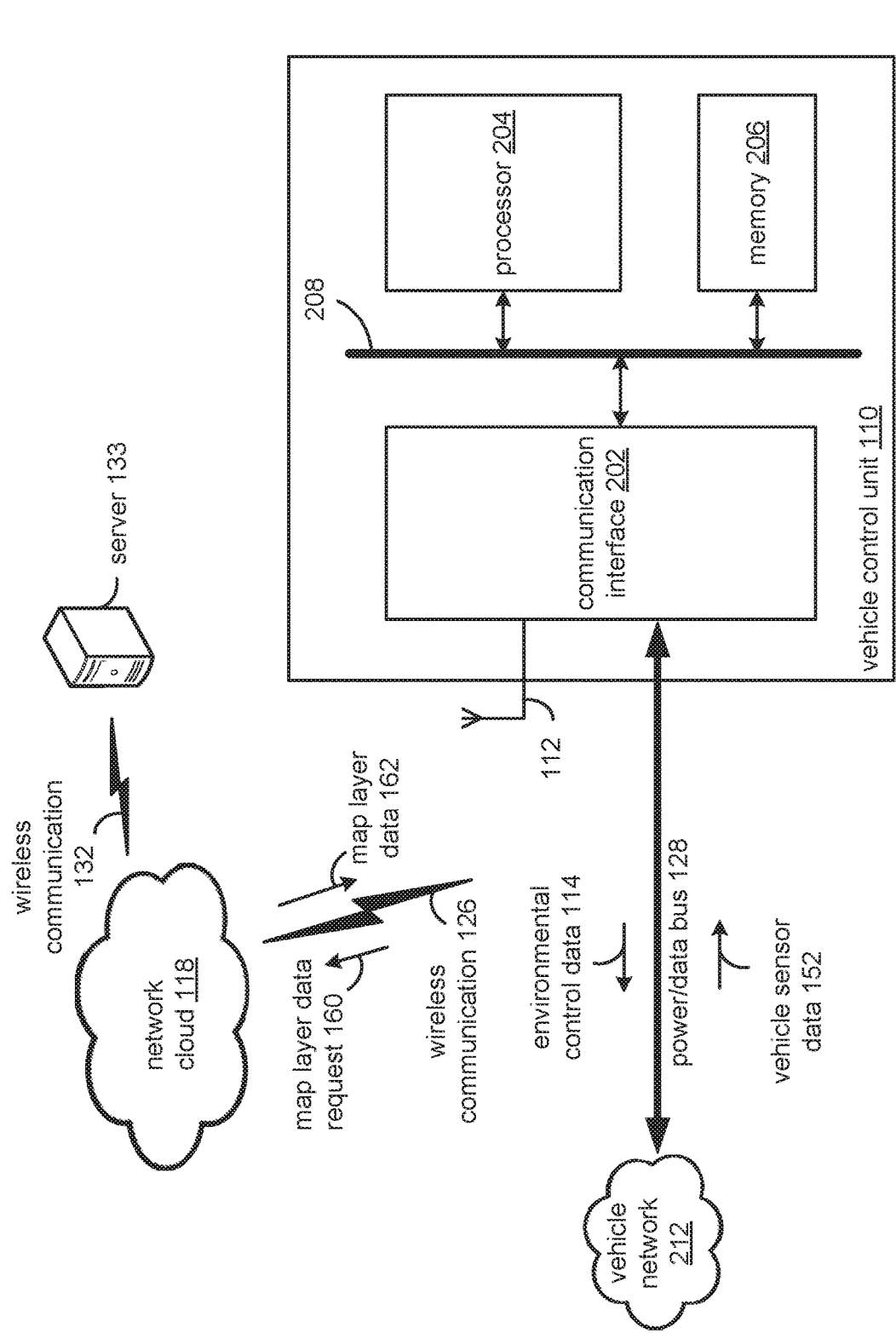
FIG. 2 illustrates a block diagram of the vehicle control unit of FIG. 1.

FIG. 2 illustrates a block diagram of the vehicle control unit 110 of FIG. 1. The vehicle control unit 110 may include a communication interface 202, a processor 204, and memory 206, that are communicably coupled via a bus 208. The vehicle control unit 110 may provide an example platform for the device and methods described in detail with reference to FIGS. 1-4.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable storage medium having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed and/or executed by the processor 204. The machine readable instructions can comprise logic or algorithm(s) written in programming languages, and generations thereof, (e.g., 1 GL, 2 GL, 3 GL, 4 GL, or 5 GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-4.

The vehicle control unit 110 can include one or more modules, at least some of which are described herein. The modules may be considered as functional blocks that can be implemented in hardware, software, firmware and/or computer-readable program code that perform one or more functions.

A module, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The communication interface 202 generally governs and manages the data received via a vehicle network 212, such as environmental-control data 114 provided to the vehicle network 212 via the power/data bus 128, as well as vehicle sensor data 152. The communication interface 202 may also operate to manage data flow with respect to external networks, such as the network cloud 118. Examples of data include map layer data request 160 transmitted via the antenna 112, and receipt of map layer data 162 in response via the wireless communication 126. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system (GPS) satellites. The received signals may be transformed into a data signal indicative of the location (for example, latitude and longitude positions), and further indicative of the positioning of the vehicle with respect to road data.

The vehicle control unit 110 may be communicatively coupled to receive signals from global positioning system satellites, such as via the antenna 112 of the vehicle control unit 110, or other such vehicle antennae (not shown). The antenna 112 operates to provide communications with the vehicle control unit 110 through wireless communication 126.

In operation, the vehicle control unit 110 may be operable to retrieve current hybrid-vehicle location data, via global positioning satellite (GPS) data. Based on the location data, the vehicle control unit 110 may generate and transmit a map layer data request 160. In response, vehicle control unit 110 may receive via wireless communication 126, in response to the map layer data request 160, map layer data 162 from the server 133 over wireless communication 132. Based on vehicle trajectory plan data, the vehicle control unit 110 may determine from the map layer data 162 a general present traffic speed for the roadway relative to a free-flowing traffic speed, and whether vehicle sensor data 152 indicates a first speed zone, in which the vehicle may be in a high-power operational mode As may be appreciated, the server 233 may be operated by an organization that provides the applications, such as a mapping application and map application layer data including roadway information data, traffic layer data, geolocation layer data, etc. Map layer data 162 may be provided in a Route Network Description File (RNDF) format. A Route Network Description File specifies, for example, accessible road segments and provides information such as waypoints, stop sign locations, lane widths, checkpoint locations, speed zones (such as first and second speed zones), and parking spot locations.

Servers such as server 233 may also provide data as Mission Description Files (MDF) for autonomous and/or semi-autonomous hybrid vehicle operation. A Mission Description Files (MDF) may operate to specify checkpoints to reach in a mission, such as along a vehicle trajectory. It should be understood that the devices discussed herein may be communicatively coupled to a number of servers by way of the network cloud 118.

In operation, having map layer data 162 and a current hybrid-vehicle location, the vehicle control unit 110 may receive vehicle trajectory plan data having at least a first speed zone and a second speed zone, wherein the first speed zone being for a high-power operational mode and the second speed zone being for a low-power operational mode. The vehicle control unit 110 may determine whether vehicle sensor data 152 indicates whether a present state of the hybrid-vehicle relates to the first speed zone.

The hybrid vehicle may also have a general overview of a vehicle trajectory plan, and portions that include a second speed limit prompting a low-power operational mode for the hybrid vehicle. For example, the vehicle control unit 110 may determine a distance for reaching the second speed zone from a current hybrid-vehicle location based on at least one of traffic congestion data, map speed limit data, destination data (and associated deceleration to a second speed zone), historic travel data (such as rush hour traffic patterns, sporting event traffic congestion, etc.), refueling waypoint data (such as a service station for refueling gasoline, diesel, bio-diesel, etc.), and crowdsource data (such as indicating a traffic incident indicating an upcoming traffic slow-down).

The hybrid vehicle may utilize an array of sensors, lasers, radar, cameras, and global positioning satellite (GPS) technology to analyze the vehicle's surroundings. With positional data and a vehicle trajectory plan, the vehicle control unit 110 may determine an estimated time-of-travel to the second speed zone.

When the vehicle sensor data 152 indicates the first speed zone, the vehicle control unit 110 may determine an estimated time-of-travel, based on vehicle speed (in miles or kilometers per second) and distance (such as in miles or kilometers) to the second speed zone based on the vehicle trajectory plan data. As may be appreciated, the estimated time-of-travel may also take into account a deceleration interval from the first speed zone to the second speed zone.

Based on the based on the estimated time-of-travel, the vehicle control unit 110 may generate heat-load buffer data for prolonging a passenger comfort setting during the second speed zone. That is, as may be appreciated, the vehicle heat-load buffer, either in terms of heating or cooling the hybrid-vehicle cabin, may exceed a climate control temperature setting by the vehicle user or to remove and/or reduce the power load or consumption by climate control motors and/or devices during the second speed zone. In this respect, during at least a portion or the full extent of distance of the second speed zone, the low-power operational mode may direct finite battery charge resources to the vehicle powertrain to achieving the vehicle trajectory plan objective (such as office destination, home destination, restaurant destination, entertainment venue destination, etc.) instead of redirecting the finite battery charge resources to climate control devices (such as fans, blowers, heaters, HVAC compressors, etc.) to otherwise maintain the hybrid-vehicle climate control settings.

The vehicle control unit 110 may convert the heat-load buffer data to environmental-control data 114, which may be transmitted via the power/data bus 128 to the vehicle network 212 for effecting the heat-load buffer data, as is discussed in detail with reference to FIGS. 3 and 4.

Figure 3:
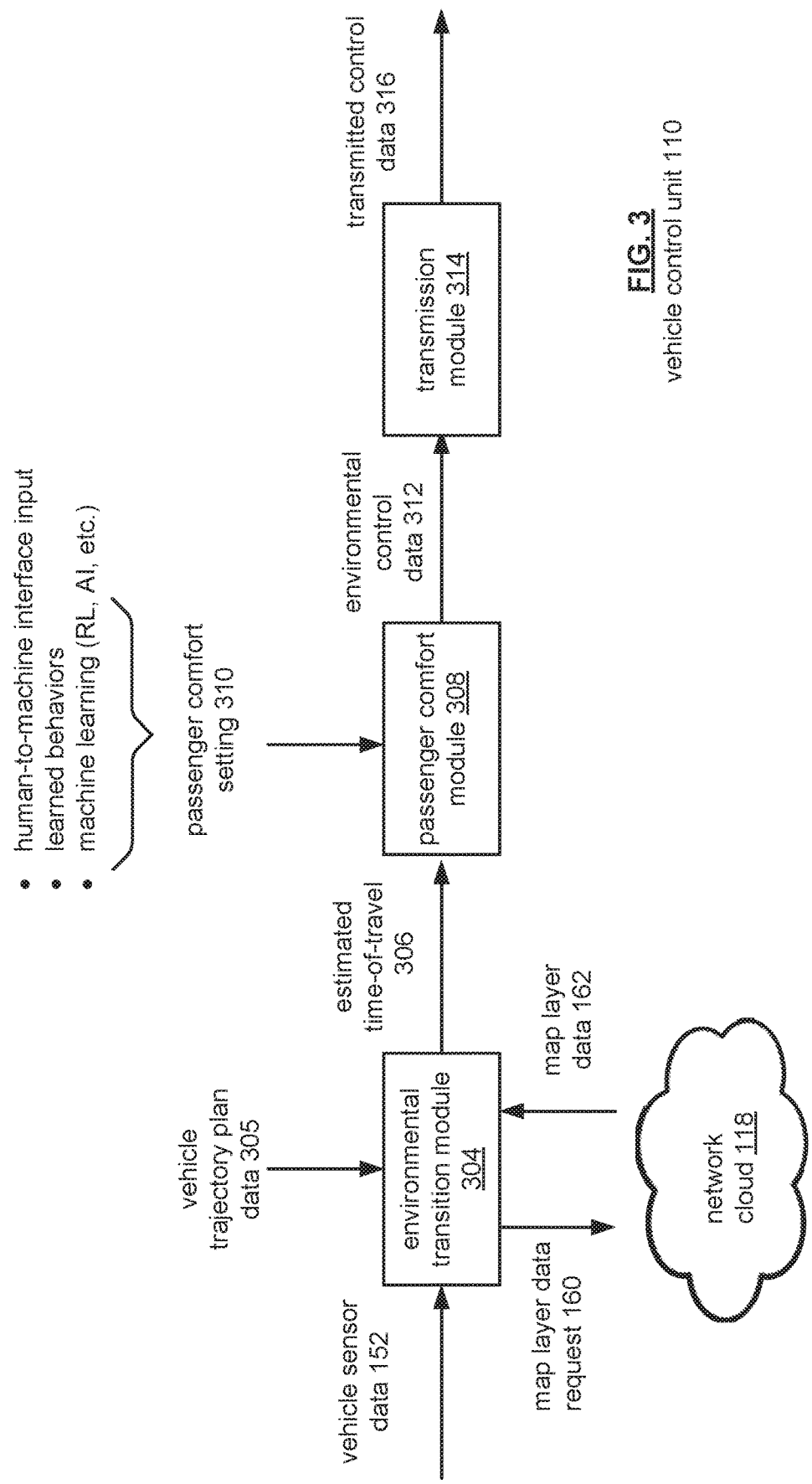
FIG. 3 illustrates a functional block diagram of the vehicle control unit for generating environmental-control data based on heat-load buffer data to prolong a passenger comfort setting in a low-power operational mode.

FIG. 3 illustrates a functional block diagram of the vehicle control unit 110 for generating environmental-control data 312 based on heat-load buffer data to prolong a passenger comfort setting in a low-power operational mode. The vehicle control unit 110 may include an environmental transition module 304, a passenger comfort module 308, and a transmission module 314, where the modules 304, 308 and 314 may be stored in the memory 206 (FIG. 2) of the vehicle control unit 110. Each of the modules may include instructions that, when executed by the processor 204 (FIG. 2), cause the processor 204 for engage in certain functions and/or objectives as described herein in detail.

The environmental transition module 304 includes instructions that, when executed by the processor 204, cause the processor 204 to receive vehicle trajectory plan data 305, which may have at least a first speed zone and a second speed zone. As may be appreciated, the first speed zone being for a high-power operational mode of the hybrid vehicle, and second speed zone being for a low-power operational mode of the hybrid vehicle.

The vehicle trajectory plan data 305 may include origin data and destination data. The origin data may include a current hybrid-vehicle location data accessed via GPS location data, and/or based on the vehicle sensor data 152, which may include vehicle speed sensor data, accelerometer sensor data, object detection sensor data (such as image recognition of local landmarks to discern current hybrid-vehicle location data), of the hybrid vehicle. The destination data may be input by a vehicle user, such as via a navigation interface of the hybrid vehicle and/or a handheld mobile device (for example, a smartphone, a tablet, a phablet, etc.).

The vehicle control unit 110 may be operable to retrieve current hybrid-vehicle location data, via global positioning satellite (GPS) data. Based on the location data, the environmental transition module 304 may generate and transmit a map layer data request 160. In response, environmental transition module 304 may receive via, in response to the map layer data request 160, map layer data 162. Based on origin and destination data relating to the hybrid vehicle, the environmental transition module 304 may determine from the map layer data 162 a general present traffic speed for the roadway relative to a free-flowing traffic speed, and whether vehicle sensor data 152 indicates a first speed zone, in which the vehicle may be in a high-power operational mode As may be appreciated, the map layer data 162 may be provided in a Route Network Description File (RNDF) format. A Route Network Description File specifies, for example, accessible road segments and provides information such as waypoints, stop sign locations, lane widths, checkpoint locations, speed zones (such as first and second speed zones), and parking spot locations.

In operation, having map layer data 162 and a current hybrid-vehicle location, the vehicle control unit 110 may receive and/or determine vehicle trajectory plan data 305, which may include at least a first speed zone and a second speed zone. The first speed zone being for a high-power operational mode (such as may be provided by enabling a petroleum-based, engine of the hybrid vehicle), and a second speed zone being for a low-power operational mode (such as may be provided by enabling an electric-based engine of the hybrid vehicle).

The hybrid vehicle may also have a general overview of a vehicle trajectory plan, and portions that include a second speed limit prompting a low-power operational mode for the hybrid vehicle. For example, the vehicle control unit 110 may determine a distance for reaching the second speed zone from a current hybrid-vehicle location based on at least one of traffic congestion data, map speed limit data, destination data (and associated deceleration to a second speed zone), historic travel data (such as rush hour traffic patterns, sporting event traffic congestion, etc.), refueling waypoint data (such as a service station for refueling gasoline, diesel, bio-diesel, etc.), and crowdsource data (such as indicating a traffic incident indicating an upcoming traffic slow-down).

The hybrid vehicle may utilize an array of sensors, lasers, radar, cameras, and global positioning satellite (GPS) technology to analyze the vehicle's surroundings. With positional data and a vehicle trajectory plan, the vehicle control unit 110 may determine an estimated time-of-travel to the second speed zone.

The environmental transition module 304, which includes instructions that, when executed by the processor 204 (FIG. 2), may operate to determine whether vehicle sensor data 152 indicates whether a present state of the hybrid-vehicle relates to the first speed zone.

When the vehicle sensor data 152 indicates the first speed zone, the vehicle control unit 110 may determine an estimated time-of-travel 306, based on vehicle speed (in miles or kilometers per second) and distance (such as in miles or kilometers) to the second speed zone based on the vehicle trajectory plan data. As may be appreciated, the estimated time-of-travel may also take into account a deceleration interval from the first speed zone to the second speed zone.

As noted, the second speed zone may be based on traffic congestion data, map speed limit data, destination data, historic travel data (such as repeated commutes to work or other locations), refueling waypoint data (for when the hybrid vehicle may require combustible fuel refueling), crowdsource data, etc.

For a refueling event, the environmental transition module 304 may include further instructions that, when executed by the processor 204, cause the processor 204 to determine, based on current range data, whether the hybrid vehicle can reach the second speed zone without refueling. When, in response to determining that the vehicle cannot reach the second speed zone without refueling, the environmental transmission module 304 may operate to determine the estimated time-of-travel for reaching a subsequent second speed zone based on a refueling waypoint.

The passenger comfort module 308 may include instructions that, when executed by the processor, cause the processor to generate heat-load buffer data to prolong a passenger comfort setting 310 during the second speed zone. As may be appreciated the magnitude of heat-load buffer may be based on the estimated time-of-travel 306 to the second speed zone.

That is, the longer the estimated time-of-travel 306 to a second speed zone, and a low-power operational mode, the more gradual application of the heat-load buffer during a high-power operational mode. An example may relate to expected travel delays, or second speed zone events, to the destination—that is, traffic flow is smooth and certain, posted speed limits are maintained or exceeded, traffic congestion is at a minimum, etc.

On the other hand, the shorter the estimated time-of-travel 306 to the second speed zone, the comparatively abrupt application of the heat-load buffer may occur during a high-power operational mode. An example may relate to unexpected travel delays, or second speed zone events, to the destination—that is, traffic flow becomes erratic, traffic congestion increases (such as during rush hour, traffic accidents), traffic flow falls below posted speed limits, etc., that may be indicated via crowdsourcing data conveyed by the map layer data 162.

In either situation of expected and/or unexpected travel delays or second speed zone events, the magnitude of the heat-load buffer (either cooling or heating) that may be applied to the hybrid-vehicle cabin corresponds the comfort of the passenger. In other words, excessive heating or cooling of the hybrid-vehicle cabin that departs substantially from the passenger comfort setting 310 may prompt a vehicle user to further adjust the passenger comfort setting 310. Accordingly, a gradual application of the heat-load buffer may be generally unnoticeable by a hybrid-vehicle user, though may be larger in temperature range; in contrast, a less gradual application of the heat-load buffer may be more noticeable, and to avoid a user changing the passenger comfort setting 310 (and the basis for the heat-load buffer), thus the magnitude of the temperature range may be less discernible to the vehicle passenger.

In the alternative, upon generating the heat-load buffer data, the vehicle control unit 110 may operate to lock-out further hybrid-vehicle user input until reaching the second speed zone.

Based on the estimated time-of-travel 306, the passenger comfort module 308 may operate to generate heat-load buffer data for prolonging a passenger comfort setting during the second speed zone.

That is, as may be appreciated, the heat-load buffer, either in terms of heating or cooling the hybrid-vehicle cabin, may exceed a passenger control setting 310 established by the vehicle user in order to remove and/or reduce the power load or consumption by climate control motors and/or devices during the second speed zone.

In this respect, during at least a portion or the full extent of traveling distance of the second speed zone, the low-power operational mode may defer and/or avoid diverting finite battery charge resources to environmental settings, and instead utilize the finite battery charge resources for the vehicle powertrain to achieve the vehicle trajectory plan objective (such as office destination, home destination, restaurant destination, entertainment venue destination, etc.). That is, instead of redirecting the finite battery charge resources to climate control devices (such as fans, blowers, heaters, HVAC compressors, etc.), the finite battery charge resources are allocated to the vehicle powertrain, while taking advantage of the heat-load buffer generated while in a high-power operational mode.

Further, machine learning may further refine the generation of the heat-load buffer data by the passenger comfort module 308. For example, reinforcement learning (RL) may allow an initialization of the parameters for generation of the heat-load buffer data. Under reinforcement learning principles, an objective is sought to be achieved, such as mitigating the load placed on the hybrid vehicle during the low-power operational mode. As an objective and/or goal is successfully achieved (such as, for example, mitigating an environmental-control load for the hybrid vehicle by a selected percentage), the reinforcement learning mechanism refines the initial parameters towards successfully obtaining the objective in varying weather conditions.

The passenger comfort module 308 may further operate to convert heat-load buffer data to environmental-control data 312. The environmental-control data 312 may control the functional of the cabin environmental systems and/or devices to lower or increase the heat-load buffer for the vehicle cabin.

The transmission module 314 includes instructions that, when executed by the processor 204, cause the processor 204 (FIG. 2) to transmit the environmental-control data 314 for effecting the heat-load buffer data. The transmission module 312 may operate to format the control data 316 for transmission via the vehicle network 212 as transmitted control data 316.

Figure 4:
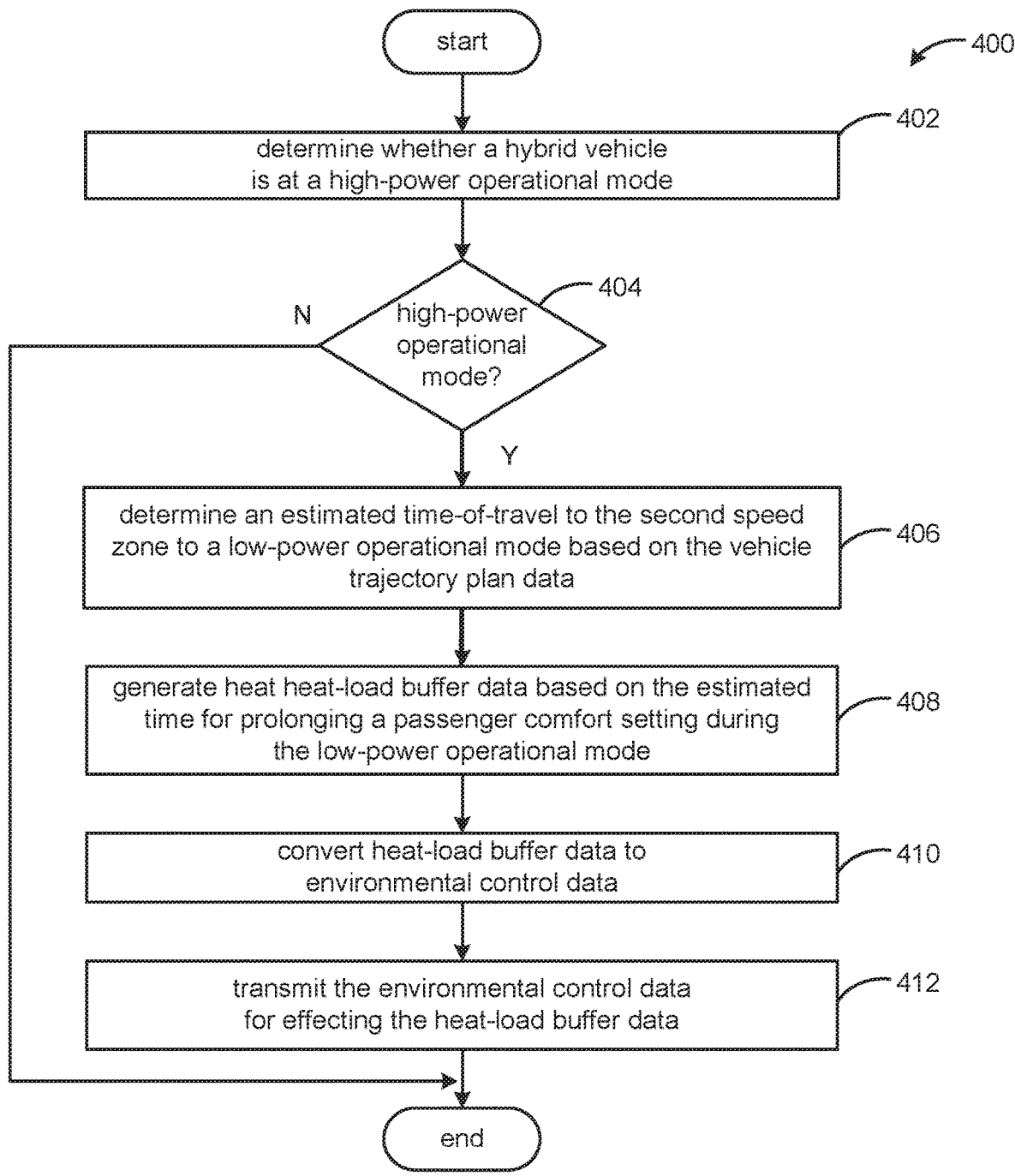
FIG. 4 is an example process for mitigating an environmental-control load for a hybrid vehicle in a low-power operational mode.

FIG. 4 is an example process 400 for mitigating an environmental-control load for a hybrid vehicle in a low-power operational mode.

In operation 402, the process 400 determines whether a hybrid vehicle is at a high-power operational mode. In a high-power operational mode, in a first speed zone for example, a hybrid vehicle may be passing other vehicles or merging onto a highway at higher speeds. In such instances, an engine component of the hybrid vehicles engages with sufficient power for a high-power operational mode. When the engine component of the hybrid vehicle is in operation, which is typically at faster speeds, heat is generated as a combustion by-product, and accordingly, provides a resource readily available to heat a vehicle cabin according to a passenger comfort setting via the vehicle's environmental controls.

When, at process 404, the hybrid vehicle is at a high-power operational mode, an estimated time-of-travel to a low-power operational mode is determined at operation 406, based on vehicle trajectory plan data. The vehicle trajectory plan data may include the current location data for the hybrid vehicle, destination data for the vehicle, which may be entered by a vehicle operator via a user interface, such as a touch screen, a handheld mobile device, etc. The destination data may also based on historical travel pattern behaviors, such as commutes to work, favorite weekend retreats, etc.

At operation 408, the process 400 generates heat-load buffer data based on the estimated time for prolonging a passenger comfort setting during a low-power operational mode.

In a low-power operational mode, the electric motors may operate to deliver power when the vehicle's gas pedal is depressed, allowing the vehicle to pull away from a traffic stop briskly to get around traffic in the city. However, for heating while in the low-power operational mode, energy for heating the cabin generally is a function of converting electric (stored) energy from the vehicle battery to heat energy, such as via a resistive heater element.

To avoid diverting the finite battery charge resource from the principal objective of reaching a destination, the heat-load buffer operates to mitigate an electric load of environmental systems during low-power operational modes. The mitigation may be realized by generating a heat-load buffer that may be a cooling or heating load to the vehicle cabin while the hybrid vehicle is in a high-power operational mode.

In this respect, at operation 410, the heat-load buffer data may be converted to environmental-control data. The environmental-control data in effect overrides the comfort control settings of the vehicle operation and/or passenger to pre-load the cabin environment before the low-power operational mode of the hybrid vehicle occurs.

At operation 412, the environmental control data may be transmitted for effecting the heat-load buffer data. In this respect, the environmental-control data may be acted upon to increase the heat and/or cooling conditions of the vehicle cabin for passenger comfort during the low-power operational mode.

That is, to prolong the passenger comfort setting while maximizing the stored electric energy of a vehicle battery, the process 400 provides a heat-load buffer to utilize the heat by-product and/or power output available from the vehicle engine in view of an estimated time-of-travel to a low-power operational mode, such as navigating city streets, at lower speeds, to the user's destination.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

Various embodiments are shown in FIGS. 1-4, but the embodiments are not limited to the illustrated structure or application. As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method in a vehicle control unit for a hybrid vehicle, the method comprising:
   receiving vehicle trajectory plan data having at least a first speed zone and a second speed zone, the first speed zone being for a high-power operational mode and the second speed zone being for a low-power operational mode;
   determining whether vehicle sensor data indicates the hybrid vehicle is in the first speed zone;
   when the vehicle sensor data indicates the first speed zone:
      determining an estimated time-of-travel to the second speed zone based on the vehicle trajectory plan data;
      generating heat-load buffer data for prolonging a temperature setting implemented in the first speed zone into at least a portion of the second speed zone based on the estimated time-of-travel;
      converting heat-load buffer data to environmental-control data; and
      transmitting the environmental-control data for implementing the heat-load buffer data.

2. The method of claim 1, further comprising:
   generating low-power environmental-control data based on the heat-load buffer data for the second speed zone; and
   transmitting the low-power environmental-control data to further prolong the temperature setting in the second speed zone.

3. The method of claim 1, wherein the determining the estimated time-of-travel to the second speed zone further comprises:
   determining a distance for reaching the second speed zone from current hybrid-vehicle location data; and
   determining current range data for the hybrid vehicle, based on current fuel level data and vehicle fuel efficiency data.

4. The method of claim 3, wherein the distance for reaching the second speed zone from the current hybrid-vehicle location is based on at least one of:
   traffic congestion data;
   map speed limit data;
   destination data;
   historic travel data;
   refueling waypoint data; and
   crowdsource data.

5. The method of claim 1, further comprising:
   determining, based on current range data, whether the hybrid vehicle can reach the second speed zone without refueling; and in response to determining that the vehicle cannot reach the second speed zone without refueling, determining an estimated time for reaching a subsequent second speed zone based on a refueling waypoint.

6. The method of claim 1 wherein the vehicle trajectory plan data comprises at least one of:
   current location data;
   map layer data; and
   destination data.

7. The method of claim 1, wherein:
   the high-power operational mode includes enabling a combustible-fuel engine of the hybrid vehicle; and
   the low-power operational mode includes enabling an electric-based engine of the hybrid vehicle.

8. A method in a vehicle control unit for a hybrid vehicle, the method comprising:
   determining whether the hybrid vehicle is in a high-power operational mode;
   when at a high-power operational mode:
      determining an estimated time-of-travel to a change to a low-power operational mode based on vehicle trajectory plan data;
      generating heat-load buffer data based on the estimated time for prolonging a temperature setting implemented while in the high-power operational mode into at least a portion of operation in the low-power operational mode;
      converting heat-load buffer data to environmental-control data; and
      transmitting the environmental-control data for implementing the heat-load buffer data.

9. The method of claim 8, further comprising:
   generating low-power environmental-control data based on the heat-load buffer data for a second low power operational mode; and
   transmitting the low-power environmental-control data to further prolong the temperature setting in the second low-power operational mode.

10. The method of claim 8, wherein the determining the estimated time-of-travel to the change to the low-power operational mode further comprises:
    determining a distance from the vehicle trajectory plan data for reaching the low-power operational mode from current hybrid-vehicle location data; and
    determining current range data for the hybrid vehicle, based on current fuel level data and vehicle fuel efficiency data.

11. The method of claim 10, wherein the distance for reaching the low-power operational mode from the current hybrid-vehicle location being is on at least one of:
    traffic congestion data;
    map speed limit data;
    destination data;
    historic travel data;
    refueling waypoint data; and
    crowdsource data.

12. The method of claim 8, further comprising:
    determining, based on current range data, whether the hybrid vehicle can reach the low-power operational mode without refueling; and
    in response to determining that the vehicle cannot reach the low-power operational mode without refueling, determining an estimated time for reaching a subsequent low-power operational mode based on a refueling waypoint.

13. The method of claim 8 wherein the vehicle trajectory plan data comprises at least one of:
    current location data;
    map layer data; and
    destination data.

14. The method of claim 8, wherein:
    the high-power operational mode includes enabling a combustible fuel engine of the hybrid vehicle; and
    the low-power operational mode includes enabling an electric-based engine of the hybrid vehicle.

15. A vehicle control unit for a hybrid vehicle comprising:
    a communication interface to service communication with a network;
    a processor communicably coupled to the communication interface; and
    memory communicably coupled to the processor and storing:
       an environmental transition module including instructions that, when executed by the processor, cause the processor to:
          receive, via the network, vehicle trajectory plan data having at least a first speed zone and a second speed zone, the first speed zone being for a high-power operational mode and the second speed zone being for a low-power operational mode;
          determine whether vehicle sensor data, retrieved via the network, indicates the hybrid vehicle is in the first speed zone; and
          when the vehicle sensor data indicates the first speed zone, determine an estimated time to the second speed zone based on the vehicle trajectory plan data;
       a passenger comfort module including instructions that, when executed by the processor, cause the processor to:
          generate heat-load buffer data for prolonging a temperature setting implemented in the first speed zone into at least a portion of the second speed zone based on an estimated time-of-travel to the second speed zone;
          convert heat-load buffer data to environmental-control data; and
          transmit the environmental-control data for implementing the heat-load buffer data.

16. The vehicle control unit of claim 15, wherein the passenger comfort module including further instructions that, when executed by the processor, cause the processor to:
    generate low-power environmental-control data based on the heat-load buffer data for the second speed zone; and
    transmit the low-power environmental-control data to further prolong the temperature setting in the second speed zone.

17. The vehicle control unit of claim 15, wherein the passenger comfort module including further instructions that, when executed by the processor, cause the processor to determine the estimated time-of-travel to the second speed zone by:
    determining a distance for reaching the second speed zone from current hybrid-vehicle location data; and
    determining current range data for the hybrid vehicle, based on current fuel level data and vehicle fuel efficiency data.

18. The vehicle control unit of claim 17, wherein the distance for reaching the second speed zone from the current hybrid-vehicle location being is on at least one of:
    traffic congestion data;
    map speed limit data;

destination data;
historic travel data;
refueling waypoint data; and
crowdsource data.

19. The vehicle control unit of claim 15, wherein the environmental transition module including further instructions that, when executed by the processor, cause the processor to:
  determine, based on current range data, whether the hybrid vehicle can reach the second speed zone without refueling; and
  in response to determining that the vehicle cannot reach the second speed zone without refueling, determine an estimated time for reaching a subsequent second speed zone based on a refueling waypoint.

20. The vehicle control unit of claim 15 wherein the vehicle trajectory plan data comprises at least one of:
  current location data;
  map layer data; and
  destination data.

* * * * *

UNITED STATES PATENT AND TRADEMARK OFFICE
CERTIFICATE OF CORRECTION

PATENT NO. : 10,632,818 B2
APPLICATION NO. : 15/783567
DATED : April 28, 2020
INVENTOR(S) : Shannon Alicia Wrobel, Joshua D. Payne and Heraldo F. Stefanon Page 1 of 1

It is certified that error appears in the above-identified patent and that said Letters Patent is hereby corrected as shown below:

In the Claims

Column 15, Line 34 should read:
on the heat-load buffer data for a second low-power Signed and Sealed this
Ninth Day of March, 2021

Drew Hirshfeld
*Performing the Functions and Duties of the
Under Secretary of Commerce for Intellectual Property and
Director of the United States Patent and Trademark Office*